United States Patent [19]

Erickson et al.

[11] 4,134,275
[45] Jan. 16, 1979

[54] VEHICLE ROOF-MOUNTED AIR CONDITIONING UNIT

[75] Inventors: Donald E. Erickson, Minneapolis; Rodney H. Volk, Eden Prairie, both of Minn.

[73] Assignee: Thermo King Corporation, Minneapolis, Minn.

[21] Appl. No.: 837,054

[22] Filed: Sep. 28, 1977

[51] Int. Cl.² .................. B60H 3/04; F25D 17/06
[52] U.S. Cl. .................................. 62/244; 62/243; 62/429
[58] Field of Search ............ 62/237, 239, 243, 244, 62/295, 297, 302, 323, 429, 449, 465

[56] References Cited

U.S. PATENT DOCUMENTS

| | | | |
|---|---|---|---|
| 2,148,596 | 2/1939 | Weiland et al. | 62/429 |
| 2,182,569 | 12/1939 | Peo | 62/241 |
| 2,496,751 | 2/1950 | Ritter | 62/302 |
| 2,869,333 | 1/1959 | Holby et al. | 62/239 |
| 2,977,774 | 4/1961 | Ferris | 62/243 |
| 2,984,993 | 5/1961 | Carraway | 62/243 |
| 3,417,576 | 12/1968 | Stucky | 62/244 |
| 3,434,300 | 3/1969 | Rueth et al. | 62/239 |
| 3,983,715 | 10/1976 | Hoir, Jr. | 62/243 |

*Primary Examiner*—Lloyd L. King
*Attorney, Agent, or Firm*—F. A. Winans

[57] ABSTRACT

An air conditioning unit having a housing providing support structure for supporting the unit on a relatively thin sheet metal roof of a bus or the like. The housing includes two opposed upright side panels which provide the support for the air conditioning components housed therein and which also in turn are supported on the bus roof, generally adjacent the sidewalls of the bus to utilize the greater load bearing capability of the roof in this vicinity. The housing is separated into an evaporator compartment and a condenser compartment by an internal bulkhead extending between and supported by the side panels. The unit includes a single condenser fan motor and a single evaporator fan motor which are each cantilevered from the bulkhead in their respective compartments to generally counterbalance one another while transferring their weight through the bulkhead to the sidewalls of the housing.

10 Claims, 5 Drawing Figures

VEHICLE ROOF-MOUNTED AIR CONDITIONING UNIT

BACKGROUND OF THE INVENTION

1. Field of the Invention

This invention relates to a roof-mounted air conditioner and heating unit for a bus or the like, and more particularly to a housing for the components of the unit which support the weight thereof on the side panels of the housing and supported on the roof adjacent the sidewalls of the bus.

2. Description of the Prior Art

Air conditioning and heating units include many similar components, such as the heating and cooling coils over which the air to be treated is passed, and condenser coils for cooling the refrigerant in the cooling system of the unit. Each of the coils also has associated therewith fan means including associated motors for forcing air thereover. Thus, the components of the air conditioning unit result in an apparatus that is quite heavy. These components are generally housed within a cabinet for mounting to a bus or supported on framework which in turn is mounted in a special compartment in the bus defining the separate airflow paths across the respective coils. In either instance, the cabinet or support frame must have sufficient strength to support the components of the unit. As a general rule, this results in multiple framing members or relatively heavy floor panels of the housing to provide sufficient strength to such an enclosure. This also generally results in rather complex designs to accommodate the structural support members and adds to the expense of fabrication and the weight of the unit.

SUMMARY OF THE INVENTION

The present invention provides an air cooling and heating unit for mounting on the sheet metal roof of a bus. The housing which encloses the roof-mounted components comprises two main side-panel members having a bulkhead extending therebetween and integrally attached at each end to the side panels to define a substantially "H" shape or two-compartment configuration. One compartment encloses the condenser coils of the unit and a single motor and condenser fan, and the other compartment encloses the evaporator and heating coils and a single motor driving a pair of evaporator fans. The respective coils extend across, and are attached to, the side-panels to be supported thereby and each motor is cantilevered from the bulkhead in the associated compartment, with each motor thus counterbalancing the suspended weight of the other motor. Such motor mounting arrangement minimizes torsional loading on the bulkhead while the weight of the two motors is transmitted through the bulkhead to the side panels. The unit, in turn, is supported on the roof of the bus adjacent and parallel to the bus sidewalls in which area the roof is capable of supporting the weight of such an air conditioning unit.

DESCRIPTION OF THE PREFERRED EMBODIMENT

The air conditioning unit of the present invention includes well-known components, connected in a typical manner to provide either cooled or heated air to a generally enclosed space. In this particular instance, the enclosed space is the interior of a bus. Further, the compressor for the refrigerant supplied to the cooling or evaporator coils of the unit is disposed in some area of the bus other than in the housing of the invention such as in the motor compartment with appropriate refrigerant lines connecting it to the components in the roof-mounted air conditioning unit of the present invention. Also, hot water lines such as from the motor compartment are connected to provide the hot water to the heating coils of the roof-mounted unit of the present invention. Thus, for the purpose of this invention, the roof-mounted air conditioning unit (having the capability for either cooling or heating the air delivered to the bus) is shown to include only the major heat exchanging coils, i.e. the evaporator and condenser coils of the cooling unit and the heating coils of the heating unit, and the motor driven fans for forcing air thereover. It is recognized that the unit typically includes other components, such as valves, controls, receivers and driers; however, as such components are, for the most part, easily supported in any available location, their particular location within the unit is not pertinent to the present invention.

Figure 1:
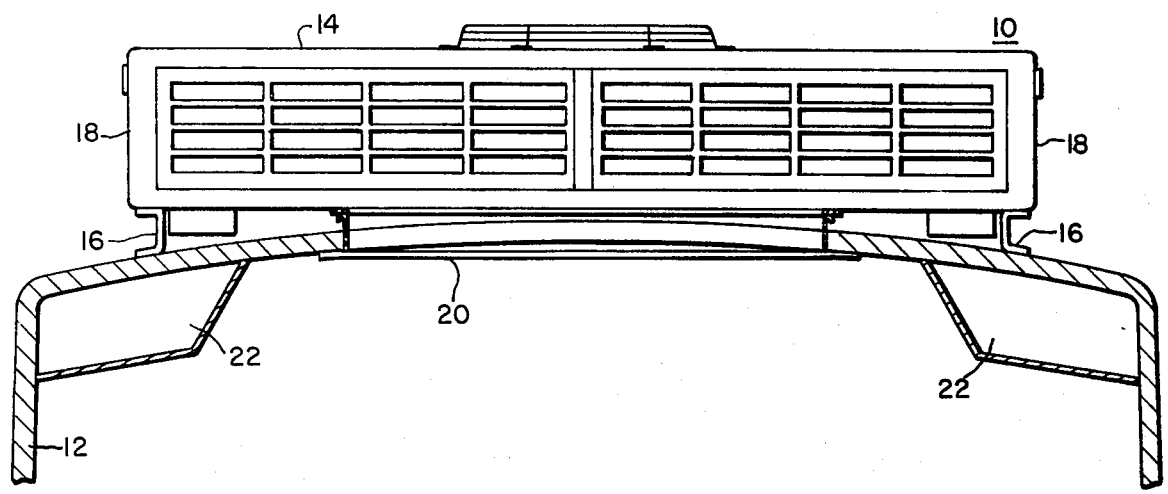
FIG. 1 is a schematic view of the air conditioning and heating unit of the present invention mounted on the roof of a bus.

Thus, referring initially to FIG. 1, it is seen that the air conditioning unit 10 of the present invention is mounted on the sheet metal roof 12 of a bus, with the roof extending from one sidewall to the other, generally without any intermediate support. The components of the unit, to be described subsequently, are enclosed in a housing 14 that extends substantially across the width of the bus, and which in turn is supported by a pair of opposed mounting rails 16 bolted or welded to the bus roof generally adjacent the sidewalls thereof so that the weight of the unit is carried on a portion of the bus roof capable of supporting it without undue stress or deformation. The rails 16 in turn are attached along the outer extremities of the housing 14 adjacent the two opposed sidewalls 18 thereof. It is seen in this figure that an air inlet duct 20 from the bus interior delivers air into the housing and, as will be later illustrated, such air is forced over heating and cooling coils to be heated or cooled and delivered back to the bus interior through the side ducts 22.

Figure 2:
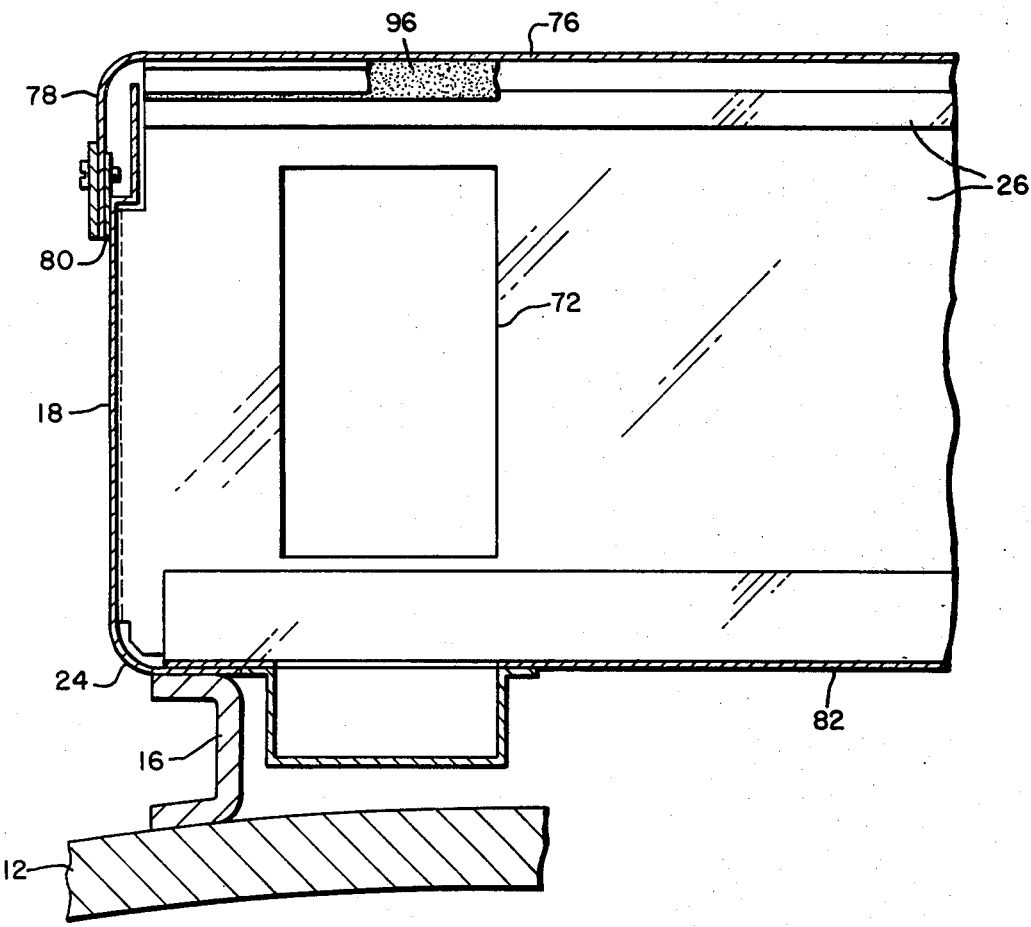
FIG. 2 is an enlarged view of a portion of FIG. 1.

Referring to FIG. 2, it is noted that, in the preferred embodiment, the mounting rails 16 are secured to an inturned flange or lip 24 of a pair of generally thin, vertical sheet metal members forming the opposed side panels 18 of the housing. As will be subsequently shown, the side panels 18 in turn provide the main support for the components within the housing so that the weight of the unit is distributed only to these side areas.

Figure 3:
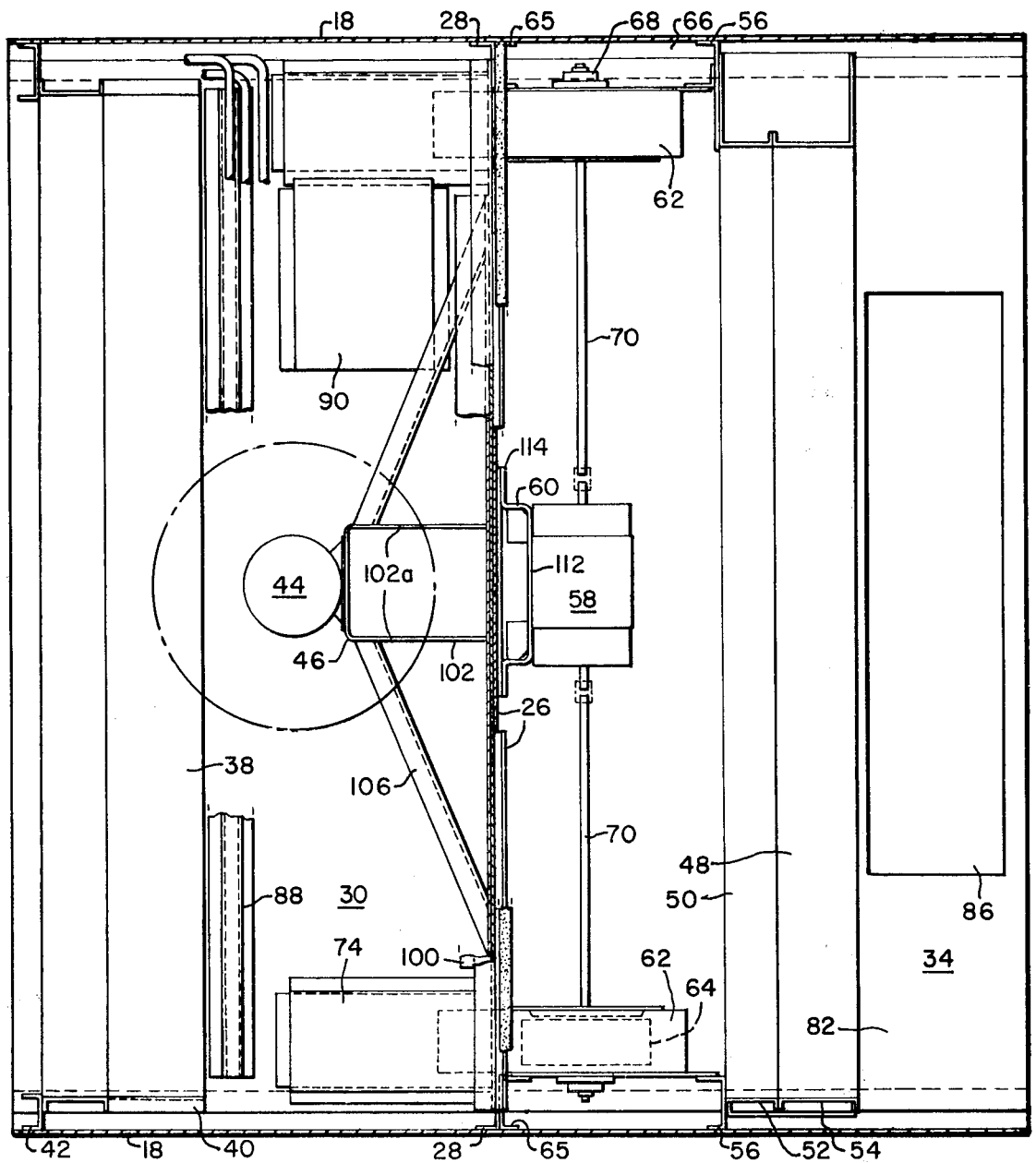
FIG. 3 is a top view of the air conditioning unit.
Figure 4:
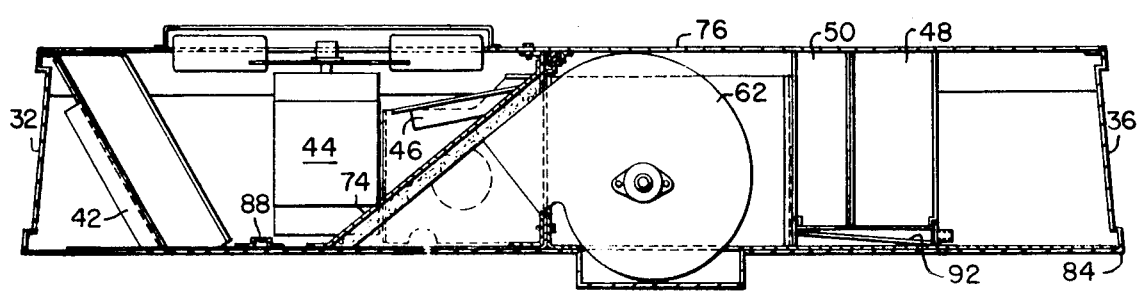
FIG. 4 is a side elevational view of the air conditioning unit of FIG. 1.

Referring to FIGS. 3 and 4, it is shown that the two opposed side panels 18 extend the full length of the housing 14 and are connected at generally their midpoint by a panel member 26 extending across the width of the unit and terminating adjacent each side panel in a lip portion 28 for welding to the panels. The panel member 26 forms a bulkhead generally separating the housing into a first compartment 30 framed at the open end by an inlet grill 32 and a second compartment 34 which is enclosed by an end panel member 36. As in herein seen, the first compartment 34 houses the condenser coil 38 of the unit with the coil ends being enclosed in a frame 40 with the coil tubes extending across the width of the housing. Each end frame is attached to support bars 42 which in turn are welded to the side panels 18.

A single motor and fan unit 44 are supported in the compartment 30 as cantilevered from the bulkhead 26 from motor mounting means 46 to be described in greater detail later.

The second compartment 34 houses the evaporator coils 48 and the heater coils 50 of the unit. The ends of each coil is enclosed in a frame 52—54 respectively with the coil tubes extending across the width of the housing. The frames are attached to upstanding braces 56 which in turn are attached, as by welding, to the side panel 18.

A single motor 58 is supported in the compartment 34 as cantilevered from the bulkhead 26 via motor mounting means 60, also to be subsequently described; but herein it is noted that it is in general alignment with the motor and fan unit 44 in the first compartment 30 so that the weight of the two motors tends to counterbalance one another as supported on the bulkhead 26, with their total weight thus transmitted through the bulkhead to be supported by the side panels 18.

The second compartment 34 also houses a pair of fan scrolls 62 enclosing centrifugal fans 64 which are supported on the opposite side panels 18 by appropriate channel supports 56, 65 welded to the adjacent side panel and providing a space 66 for the fan bearings 68. Opposed shafts 70 drivingly connect the motor 58 to the two fans 64. The bulkhead 26 also defines appropriate apertures 72 (see FIG. 2) for the discharge end of the fan scrolls to project therethrough into confined discharge ducts 74 passing through the forward compartment 30 to mate with tubes in the bus (not shown) for delivery of the conditioned air into the ducts 22 in the bus.

A top member 76 forms the cover of the housing 14 and extends from the front grill 32 to the back panel 36 and across the width of the unit, with downwardly turned sides 78 mating with an upstanding projection 80 from the opposed panels 18 to provide a watertight seal along the sides. The cover defines an opening in alignment with the motor and fan unit 44 in the first compartment so that, in conjunction with the grill 32 providing an air inlet to the compartment, a flow path through the compartment is defined to provide cooling air to the condenser coils 42 disposed therein.

A generally planar floor member 82 extends across the bottom of the housing with the sides thereof resting on and welded to the inturned flange or lip portions 24 of the side panels 18 and the front and rear edges received in the frame of the grill 32 and an inturned lip 84 of the back panel 36 respectively to form the floor of the compartment. The floor defines an aperture 86 therethrough into the second compartment 34 for the return air inlet 20 from the bus and a pair of apertures in the first compartment for the air discharged back into the bus from the centrifugal fans 64. Also, the floor in the first compartment has a stiffening bar 88 welded thereacross to provide a degree of stiffness to prevent "oil canning", and a small planar plate 90 for mounting refrigeration valves, driers, a receiver, controls, etc. thereon that have minimal weight. Except for such panel 90, the floor provides no support to the components enclosed within the housing 14.

The floor portion in the second compartment provides no support for the components therein. A drip or catch pan 92 is disposed subadjacent the evaporator and heating coils 48 and 50 to catch condensate collected thereon. The pan 92 extends across the width of the compartment so as to be supported by the structure 56 attached to the sidewalls.

Figure 5:
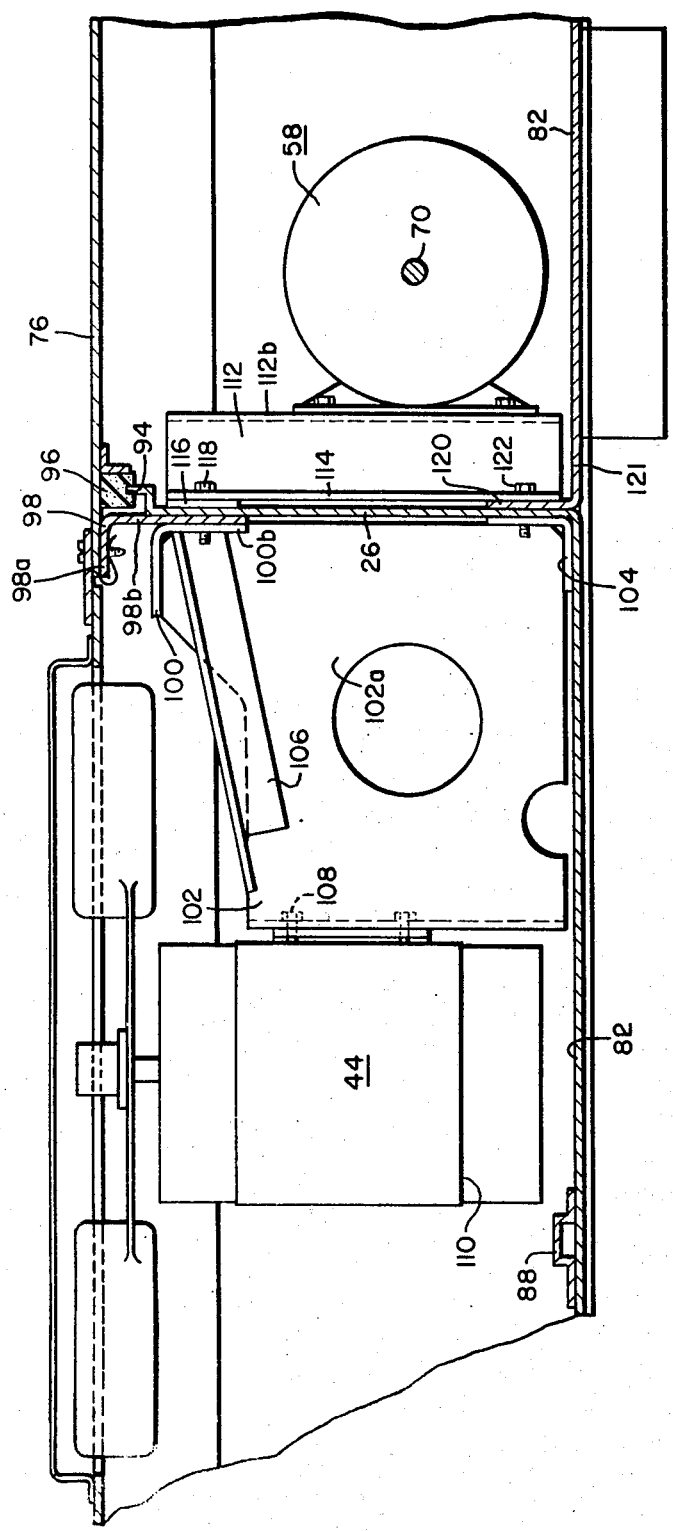
FIG. 5 is an enlarged view of a portion of FIG. 3.

Referring now to FIG. 5, the motor mounting means 46 and 60 for mounting the condenser and evaporator motors respectively in counterbalancing arrangement as cantilevered from the bulkhead is shown. Initially it is pointed out that the bulkhead 26 is formed at its uppermost edge with two right angle bends to form a stepped configuration, supporting on its uppermost edge 94 a gasket 96 for sealingly engaging the cover 76 to provide a sealed evaporator compartment 34. From the stepped configuration, the bulkhead 26 extends vertically downwardly forming the panel separating the two compartments and, at the bottom is bent at a right angle to form the floor 82 of the first compartment 30.

An upper "L"-shaped angle support 98 is secured to the upper portion of the bulkhead 26 and projects above the bulkhead to be substantially level with the upper surface of the gasket 94 so that the forwardly extending portion 98a thereof supports the cover 76 and provides a surface to which the cover can be attached, as by fasteners.

A second upper "L"-shaped support 100 is attached to the vertical leg 98b of the first such support 98 and extends horizontally across a portion of the width of the housing. A "U"-shaped bracket (see FIG. 4) 102 has the upper corner of the free ends of the legs 102a thereof attached, as by welding, to the second upper support 100 and the lower corner of the free end of the legs attached to a lower "L"-shaped support 104 having one face abutting the bulkhead 26 and the other face abutting the condenser compartment floor 82. In this manner, the bracket 102 is suspended from the bulkhead and spaced from the floor.

A pair of opposed bracing members 106 formed of similar "L"-shaped angle supports extend from each side of the "U"-shaped bracket, adjacent the bight portion 102b thereof, rearwardly and upwardly in a diverging manner, to be secured as by welding to the second upper angle support 100 to further support the bracket 102 therefrom. The single condenser motor and fan unit 44 is then mounted, as through bolts 108, securing the motor mounting strap 110 encircling the motor to the bight portion 102b of the "U"-shaped bracket 102.

The evaporator fan motor 58 is also mounted to a generally "U"-shaped bracket 112 having outboard extending flanges 114 on the free ends of the legs thereof for abutting facing engagement at their upper end with a strap member 116 bridging them and attached to the surface of the bulkhead 26 as through bolts 118. It will be noted that the strap 116 is directly opposite the legs 98b, 100b of the two upper angle supports 98 and 100 supporting the condenser motor 44 so that the bolts 118 that attach the strap pass through the two legs of the angle supports and the bulkhead. Thus, the motors are supported on opposite sides of the bulkhead through a common attachment, such that they are in a counterbalancing arrangement, minimizing torsional loading on the bulkhead from their cantilevered support.

The lower corner of the free ends of the bracket 112 abut against an upstanding lip 120 of a panel 121 which forms the floor 82 of the evaporator compartment. As before, the bolts 122 which secure the bottom of the condenser motor bracket 102 to the bulkhead 26 also pass through the angle support 104 supports with evaporator motor bracket 112, and the evaporator fan motor 58 is attached to the bight portion 112b of the bracket 112 with the drive shaft thereof in proper alignment with the fan shafts 70.

Thus, an air conditioning housing is provided enclosing and supporting the air conditioning components to be mounted on the roof of a bus and wherein all major housed components are supported on the side panels 18 of the housing, which in turn are supported on the bus roof in the vicinity of the walls and further, the single evaporator fan motor 58 and the single condenser motor and fan unit 44 are supported in a cantilevered counterbalancing arrangement from a common bulkhead 26 which separates the housing into the evaporator compartment 34 and condenser compartment 30 and also transmits the weight of the motors and fans to the side panels 18.

What is claimed is:

1. An air conditioning unit for mounting on the roof of a vehicle, said unit comprising air cooling and heating components, including an evaporator coil, a condenser coil, a heater coil, a condenser fan driven by a first motor, evaporator fan means driven by a second motor, and a housing for enclosing and supporting said components, said housing comprising:
   a pair of opposed facing side panels and a cross panel secured at opposite ends to generally the midpoint of said respective side panels;
   first means defining a generally planar bottom member coextensive with the area between the side panels, and second means in opposed relationship to said first means and generally coextensive therewith to define a cover member, whereby said housing generally defines an enclosure internally partitioned by said cross panel into a first compartment and a second compartment;
   said condenser coil disposed within said first compartment extending between and supported by said opposed side panels;
   said heater coil and evaporator coil disposed within said second compartment, each of said coils extending between and supported by said opposed side panels, and;
   means supporting said condenser fan and first motor in said first compartment cantilevered from said cross panel, and means supporting said second motor in said second compartment cantilevered from said cross panel in generally opposed relationship with said first motor, whereby said first and second motors generally counterbalance one another to reduce torsional loading on said cross panel and the weight of said components are supported from the opposed side panels.

2. Structure according to claim 1 wherein each of said side panels defines a horizontal inwardly projecting bottom marginal portion and said first means defining a planar bottom member overlaps said marginal portion for attachment thereto.

3. Structure according to claim 1 wherein said first means defining said bottom member comprises a horizontally extending portion of said cross panel forming the bottom member of one of said compartments and a separate generally planar sheet having an upturned lip for attachment to said cross panel, said sheet forming the bottom member of the other of said compartments.

4. Structure according to claim 1 wherein said means supporting said first motor comprises a bracket member secured to one face of said cross panel and said first motor is attached to said bracket member with both said motor and said bracket member spaced from and receiving no support from said planar bottom member.

5. Structure according to claim 4 wherein said means supporting said second motor comprises a second bracket member disposed on the other face of said cross panel and said second motor is attached to said second bracket in general alignment with said first motor to effectively counterbalance the torsional loading on said cross panel.

6. An air conditioning unit for mounting on the roof of a bus or the like for support thereon generally adjacent the sidewalls of said bus, said unit comprising a housing enclosing air conditioning components including a condenser coil, an evaporator coil, a heater coil, a first motor drivingly connected to a fan adjacent said condenser coil and a second motor drivingly connected to fan means associated with said heater coil and said evaporator coil, said housing comprising:
   a pair of opposed side panels;
   a cross panel attached to each side panel to define a first compartment and a second compartment;
   means supporting said condenser coil within said first compartment from said side panels;
   means supporting said evaporator coil and said heater coil in said second comparment from said side panels; and,
   first means for mounting said first motor in said first compartment cantilevered from said cross panel; and
   second means for mounting said second motor in said second compartment cantilevered from said cross panel;
   wherein said first motor generally counterbalances said second motor to reduce torsional loading on said cross panel and the weight of all said components are supported by said side panels, and;
   means mounting said housing to said bus roof, said mounting means disposed generally adjacent the sidewalls of said bus and the side panels of said housing.

7. Structure according to claim 6 wherein;
   said first means for mounting said first motor comprises a first bracket member secured to one face of said cross panel through fastening means with said bracket member generally adjacent the midpoint between said side panels, and means for mounting said first motor and associated condenser fan to said first bracket; and
   said second means for mounting said second motor comprises another bracket member secured with fastening means to the opposite face of said cross panel generally directly opposed from said first bracket member, and means for mounting said second motor to said other bracket member whereby the torsional loading by one motor is generally counterbalanced by the other motor and the weight of said motors is distributed generally equally to said side panels.

8. Structure according to claim 7 wherein said first and second bracket members are secured to said cross panel with common fastening means.

9. Structure according to claim 6 wherein said evaporator coil and heater coil fan means comprises two centrifugal fans, each of said fans including a fan rotor mounted within a scroll member, and wherein said fans are oppositely disposed adjacent opposite side panels by means for supporting said respective scrolls from the adjacent side panel; and further wherein, said second motor includes drive shaft means extending from opposite ends thereof to drive the rotors of both fans therefrom.

10. Structure according to claim 6 wherein said housing further includes opposed top and bottom members for generally enclosing said compartments and wherein the bottom member of one of said compartments is formed by a horizontal integral extension of said cross panel and the bottom of said remaining compartment is formed by a separate generally planar sheet having an upturned lip for attachment to said cross panel.

* * * * *